United States Patent
Markowski et al.

(10) Patent No.: US 7,190,291 B2
(45) Date of Patent: Mar. 13, 2007

(54) PROGRAMMABLE ERROR AMPLIFIER FOR SENSING VOLTAGE ERROR IN THE FEEDBACK PATH OF DIGITIALLY PROGRAMMABLE VOLTAGE SOURCES

(75) Inventors: Piotr Markowski, Worcester, MA (US); Chanchal Gupta, Needham, MA (US); John A. McNeill, Stow, MA (US)

(73) Assignee: Artesyn Technologies, Inc., Boca Raton, FL (US)

( * ) Notice: Subject to any disclaimer, the term of this patent is extended or adjusted under 35 U.S.C. 154(b) by 0 days.

(21) Appl. No.: 11/029,307

(22) Filed: Jan. 5, 2005

(65) Prior Publication Data

US 2006/0145899 A1    Jul. 6, 2006

(51) Int. Cl.
*H03M 1/00* (2006.01)

(52) U.S. Cl. .................. 341/122; 341/172; 341/143; 341/155

(58) Field of Classification Search ................ 341/172, 341/122–125, 155, 118, 120, 143
See application file for complete search history.

(56) References Cited

U.S. PATENT DOCUMENTS

| | | | |
|---|---|---|---|
| 4,630,187 A | | 12/1986 | Henze |
| 4,876,544 A | * | 10/1989 | Kuraishi ..................... 341/166 |
| 5,260,861 A | | 11/1993 | Wert |
| 5,272,615 A | | 12/1993 | Wert |
| 5,276,603 A | | 1/1994 | Stanley |
| 5,414,614 A | | 5/1995 | Fette et al. |
| 5,606,320 A | * | 2/1997 | Kleks ......................... 341/161 |
| 5,638,072 A | * | 6/1997 | Van Auken et al. ........ 341/141 |

(Continued)

OTHER PUBLICATIONS

Patella, Benjamin J., et al., "High-Frequency Digital PWM Controller IC For DC/DC Converters," *IEEE Applied Power Electronics Conference (APEC)*, Mar. 2002, pp. 374-380.

(Continued)

*Primary Examiner*—Linh V. Nguyen
(74) *Attorney, Agent, or Firm*—Kirkpatrick & Lockhart Preston Gates Ellis LLP

(57) ABSTRACT

A programmable error amplifier (PEA) that may be used as part of a voltage regulation subsystem to control the output of a digitally programmable voltage source is disclosed. According to various embodiments, the PEA comprises an amplification circuit, an analog voltage sampling circuit and a digital reference voltage sampling circuit. The amplification circuit may employ a negative feedback configuration, and include an amplifier and a plurality of feedback capacitors. The analog voltage sampling circuit is responsive to an analog input voltage (such as the output of the programmable voltage source) and is coupled to the amplification circuit. During a first operational phase (the sampling phase), the analog voltage sampling circuit stores a charge dependent upon the analog input voltage, and during a second operational phase (the conversion phase), the analog voltage sampling circuit transfers the charge to the feedback capacitors of the amplification circuit. The digital reference voltage sampling circuit is responsive to a digital programming word and also is coupled to the amplification circuit. During the first (sampling) phase, the digital reference voltage sampling circuit stores a charge dependent upon the digital programming word, and during the second (conversion) phase transfers the charge to the feedback capacitors of the amplification circuit. A differential voltage based on the difference between the analog voltage and a reference voltage determined by the digital programming word appears across the input terminals of the amplifier.

21 Claims, 4 Drawing Sheets

U.S. PATENT DOCUMENTS

| | | | |
|---|---|---|---|
| 5,841,310 A * | 11/1998 | Kalthoff et al. | 327/337 |
| 6,020,729 A | 2/2000 | Stratakos et al. | |
| 6,037,887 A * | 3/2000 | Wu et al. | 341/143 |
| 6,100,676 A | 8/2000 | Burstein et al. | |
| 6,198,261 B1 | 3/2001 | Burstein et al. | |
| 6,268,716 B1 | 7/2001 | Burstein et al. | |
| 6,418,039 B2 | 7/2002 | Lentini et al. | |
| 6,466,465 B1 | 10/2002 | Marwali | |
| 6,483,448 B2 * | 11/2002 | Martin et al. | 341/123 |
| 6,563,294 B2 | 5/2003 | Duffy et al. | |
| 6,563,364 B2 | 5/2003 | Lee et al. | |
| 6,590,369 B2 | 7/2003 | Burstein et al. | |
| 6,600,300 B2 | 7/2003 | Groeneveld et al. | |
| 6,630,868 B2 | 10/2003 | Perrott et al. | |
| 6,882,295 B2 * | 4/2005 | Leung | 341/155 |
| 6,906,653 B2 * | 6/2005 | Uno | 341/150 |
| 2003/0001638 A1 | 1/2003 | Watarai | |
| 2003/0160598 A1 | 8/2003 | Imai et al. | |
| 2003/0174005 A1 | 9/2003 | Latham et al. | |
| 2004/0052098 A1 | 3/2004 | Burstein et al. | |
| 2004/0095122 A1 | 5/2004 | Chapuis | |
| 2004/0123164 A1 | 6/2004 | Chapuis et al. | |
| 2004/0155637 A1 | 8/2004 | Chapuis | |
| 2004/0156219 A1 | 8/2004 | Chapuis | |
| 2004/0196014 A1 | 10/2004 | Chapuis | |
| 2005/0200510 A1 * | 9/2005 | Yoshida et al. | 341/155 |

OTHER PUBLICATIONS

Wei, Gu-Yeon, et al., "A Low Power Switching Power Supply for Self-Clocked Systems," *1996 International Symposium on Low Power Electronics and Design*, pp. 313-318, no month.

Peterchev, Angel V., et al., "Architecture and IC Implementation of a Digital VRM Controller," *IEEE Trans. on Power Electronics*, vol. 18, No. 1, Jan. 2003, pp. 356-364.

* cited by examiner

PROGRAMMABLE ERROR AMPLIFIER FOR SENSING VOLTAGE ERROR IN THE FEEDBACK PATH OF DIGITALLY PROGRAMMABLE VOLTAGE SOURCES

BACKGROUND

The present invention generally concerns circuits and methods for sensing voltage feedback information in digitally programmable voltage sources.

Most modern electronic devices depend on tightly regulated sources of electrical energy for their operation. In a typical arrangement, the flow of energy is regulated in a manner that ensures a constant voltage at the power supply terminals of the powered devices. The performance of these devices (e.g., the speed, consumed power, error rate, reliability, etc.) depends strongly on the magnitude of the voltage supplied by the power source. Therefore, depending on the system considerations and operational objectives this voltage may need to be adjusted and regulated with great precision. Moreover, many auxiliary parameters of the power source may need to be modified as well. Among the most frequently encountered are protection limits (e.g., overvoltage, undervoltage, overcurrent), startup/shutdown options (e.g., delay, ramp rate), feedback loop compensation and others. The necessity to frequently alter these parameters forces designers to leverage digital techniques in constructing circuits to control the flow of power. Digital technology allows such modifications to be performed via communication with a supervisory entity without a need for physical modification. It can also be performed in the system, sometimes even without interrupting the operation of the equipment.

One of the major challenges in implementing digital control in power conversion is the ability to sense the voltage generated by the converter (output voltage) as accurately as possible. The error in sensing this parameter cannot be compensated in any way within the control circuitry and will adversely affect the quality of the operation to the degree proportional to the sensing error.

The standard way of developing voltage feedback information in power supplies is based on providing a stable and precise reference voltage source equal to the desired output voltage and comparing it with the actual output voltage. The difference is then amplified and its frequency characteristic compensated (modified) to achieve dynamic regulation objectives (e.g., stability, disturbance rejection, robustness, etc).

From this model one can derive two sources of steady state error in sensing the output voltage: one coming from the inaccurate magnitude of the voltage reference and the second from the offset error introduced during the process of subtracting it from the actual output voltage. Multiple techniques have been developed to minimize these errors to the acceptable level.

Digital technology changes the nature of voltage sensing error slightly. In the typical implementation of a digitally programmable voltage source, as shown in FIG. 1, the amplitude of the output voltage is converted to digital form by the analog to digital (A/D) converter 10. Next, the digital signal representing the reference (target) voltage 11 is subtracted from the digitized, measured value of the output voltage by a digital subtraction circuit 12 to obtain the magnitude of error. The result (error in a digital form) is subsequently used to modify the rate of flow of power in the power conversion subsystem of the voltage source according to the methods known in the art.

This arrangement keeps the first source of the error (the magnitude of the analog reference voltage) unaffected, even though the analog reference shifts to the A/D converter 10. The second source of error, the offset of the subtracting entity, is absent (digital subtracting does not suffer from offset error), but is replaced by three other sources of inaccuracy: (1) A/D conversion error (other than the analog reference error), (2) digitization resolution error (also known as a quantization noise), and (3) conversion delay error. A/D conversion error may be caused by such factors as non-ideal ratios of resistors or capacitors used for the conversion, clock charge feed-through, sample and hold error, etc. Digitization resolution error is caused by the fact that the output voltage, which can assume any value over a continuous range (as an analog quantity), must be converted to a digital representation which can assume only discrete values out of the set realizable for a given A/D converter. Conversion delay is caused by the finite time that is needed for an A/D converter to convert the analog voltage present in its inputs into the digital representation, and is equivalent to the signal group delay.

These three errors, in certain applications, necessitate the use of a high performance, high quality A/D converter. Such an A/D converter may need to have a 12 bit resolution, low differential and integral non-linearity, and a high sampling rate (at least equal to the power switching frequency or higher). An A/D converter meeting such requirements is expensive, consumes a lot of power and takes a lot of space on the die. As such, it is one of the most important limitations in introducing digital control into high volume, low cost power converters.

Due to the specific properties of the power supply as a regulation system, however, it is possible to simplify the structure of the A/D converter dramatically while retaining its full utility in such applications. The modification comes from the simple observation that accurate feedback information is needed only if the system is able to maintain its output close to the desired value. If the deviation exceeds a certain maximum amplitude it is a sign of serious malfunction and the device should protect itself and the system it powers by shutting down as soon as possible. Such behavior does not reduce the utility of the power supply because in modem electronics the tolerance of the system to the voltage deviation is minimal. If the supply voltage cannot be maintained close to the optimal value, the operation of the system cannot be maintained and it should shut down to minimize the risk of further damage.

If, on the other hand, the supply voltage can be maintained close to the optimal value, it is possible to use a voltage feedback A/D converter that is designed to operate only within a narrow range around the target voltage, as shown in converter of FIG. 2. In the extreme case, the resolution can be limited to one bit (output voltage above the target or below the target). This technique is known in control theory and used in practice in many industries as a hysteretic, bi-stable (on-off) or sliding mode control. Typically, resolving the sign and the amplitude of the regulation error needed to switch the controls is not recognized as A/D conversion, but the principle is still exactly the same.

Practical considerations associated with power conversion, like precise regulation, minimization of the output ripple, good dynamic operation, noise rejection and robustness, however, require feedback information with more resolution. One possible structure of this type of digital feedback sensing characterized by great simplicity was proposed in Gu-Yeon Wei, Mark Horowitz, "A Low Power Switching Power Supply for Self-Clocked Systems", 1996

International Symposium on Low Power Electronics and Design, pp. 313–318. This circuit takes advantage of the fact that the delay of the standard digital gate depends strongly on the supply voltage. It is then possible to construct a voltage controlled oscillator. The frequency of this oscillator is then compared with the reference frequency, and the difference represents the error. A similar principle is used as the basis of the circuit presented in Benjamin J. Patella, Aleksander Prodic, Art Zinger, Dragan Maksimovic, "High Frequency Digital Controller IC for DC/DC Converters", IEEE Applied Power Electronics Conference, March 2002, pp. 374–380. Here, the propagation through the delay line having Vdd connected to the measured voltage is evaluated as a proxy for the output voltage. Both these solutions sacrifice accuracy and the possible adjustment range of the output voltage for simplicity.

A more universal approach (similar to FIG. 2) is presented in Angel V. Peterchev, Jinwen Xiao, Seth R. Sanders, "Architecture and IC Implementation of a Digital VRM Controller", IEEE Transactions on Power Electronics, January 2003, pp. 356–364. In this approach, the process of obtaining the error signal is performed in the analog domain. It is based on subtracting the output voltage from the reference generated by a DAC (Digital to Analog Converter). The high resolution required for precise regulation in this approach is shifted from a fast A/D converter to a slow DAC with great savings in complexity, cost and power consumption. Consequently, only the difference between these voltages is converted to the digital form. The Peterchev reference advises that 3 to 4 bits of resolution are sufficient (even less if a non-linear control scheme is used). A suitable flash A/D converter can be implemented with moderate resources. This approach allows for precise control in the range, the center of which is set by the DAC.

This technique, even though more precise then those described above, still suffers from offset and drift errors introduced by the multiple amplifiers that are necessary for implementing this structure. The exact sources of error depends on the details of the implementation, but typically the following errors may be distinguished: (i) internal DAC amplifier error; (ii) differential to single ended feedback voltage conversion error; (iii) analog reference and feedback voltage subtraction error; and (iv) flash A/D comparator offset error. The magnitude of these errors typically ranges between a few millivolts to a few tens of millivolts over the span of operating conditions. These errors cause errors in the feedback information, which in turn leads to an erroneous voltage produced by the power supply. Moreover, potential nonmonotonicity of the comparator ladder in a flash A/D converter (overlapping of adjacent threshold levels) may result in the loss of stability. As trimming large number of comparators is not practical, auto-zeroing topologies must be used. This, in turn, results in increased complexity, size, power consumption and slower operation.

An alternative way of solving this problem would be an analog preamplifier. It allows increasing the amplitude of the analog signal before it enters the A/D converter, thus reducing the relative importance of individual comparators errors (reducing differential non-linearity). Such preamplifiers, however, introduce their own offset and drift errors. They also introduce additional errors due to variation of the gain, resulting in degrading integral non-linearity.

Accordingly, there exists a need for an amplifier that is capable of achieving the aforementioned objectives, but with a simpler, more compact and more accurate structure.

SUMMARY

In one general aspect, the present invention is directed to a programmable error amplifier (PEA) that may be used as part of a voltage regulation subsystem to control the output of a digitally programmable voltage source. According to various embodiments, the PEA comprises an amplification circuit, an analog voltage sampling circuit and a digital reference voltage sampling circuit. The amplification circuit may employ a negative feedback configuration and, as such, include an amplifier and a plurality of feedback capacitors. The analog voltage sampling circuit is responsive to an analog input voltage (such as the output of the programmable voltage source) and is coupled to the amplification circuit. During a first operational phase (the sampling phase), the analog voltage sampling circuit stores a charge dependent upon the analog input voltage, and during a second operational phase (the conversion phase), the analog voltage sampling circuit transfers the charge to the feedback capacitors of the amplification circuit. The digital reference voltage sampling circuit is responsive to a digital programming word and also is coupled to the amplification circuit. During the first (sampling) phase, the digital reference voltage sampling circuit stores a charge dependent upon the digital programming word, and during the second (conversion) phase transfers the charge to the feedback capacitors of the amplification circuit.

The output terminals of the analog voltage sampling circuit and output terminals of the digital reference voltage sampling circuit may be connected to the input terminals of the amplifier of the amplification circuit such that a differential voltage based on the difference between the analog voltage and a reference voltage determined by the digital programming word appears across the input terminals of the amplifier, which may be an operational transconductance amplifier. The amplifier amplifies this voltage, and the output of the amplifier therefore corresponds to an amplification of the difference between the analog input voltage signal and a reference voltage that is set by the digital programming word.

According to various implementations, the digital reference voltage sampling circuit may include two binary-weighted arrays of capacitors. For example, if the digital programming word has a length of k bits, each array of capacitors may include k+1 binary weighted capacitors. The capacitors of the arrays are connected to either of two reference voltages during the first operational phase depending on whether the corresponding binary signal of the digital programming word for the respective capacitor is set (e.g., a logic high) or not (e.g., a logic low). This allows the digital reference voltage sampling circuit to set the output voltage reference in $2^k$ increments.

Among the benefits that may be realized with embodiments of the present invention is that only one amplifier is needed, which reduces offset and drift errors. Also, highly accurate capacitor ratios may be used for scaling voltages. In addition, a low resolution flash A/D converter may be used to converter the output signal of the PEA to a digital error signal while still maintaining sufficient regulation of the programmable voltage source. Also, the use of a differential structure (i.e., carrying signals between negative and positive signal lines) makes the PEA less susceptible to noise, as does disconnecting the amplifier from the analog input during the second operational (conversion) phase. These and other potential benefits will be apparent from the description below.

DESCRIPTION OF THE FIGURES

Various embodiments of the present invention are described herein by way of example in conjunction with the following figures, wherein.

DETAILED DESCRIPTION

Figure 3:
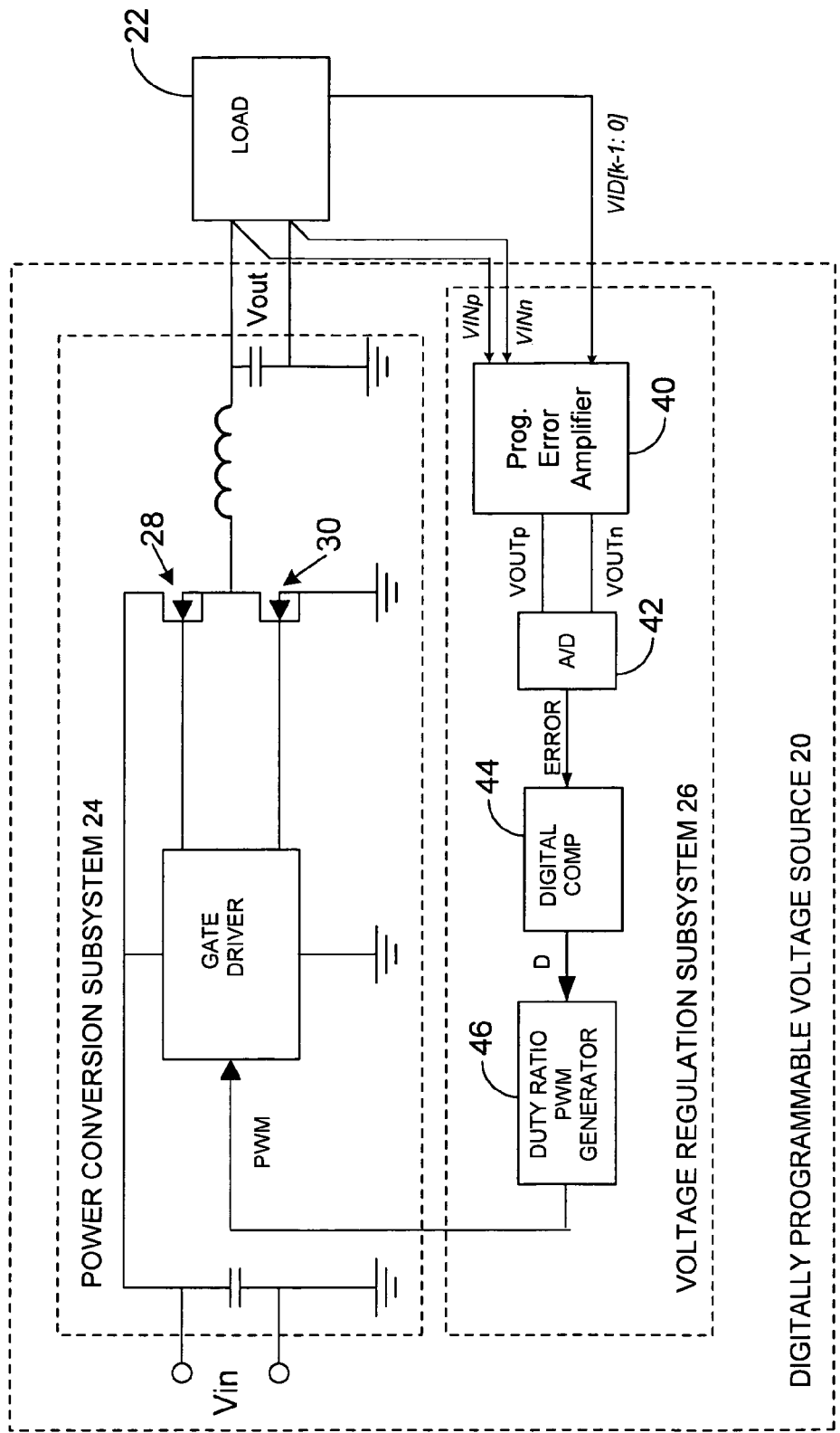
FIG. 3 is a diagram of a programmable voltage source according to various embodiments of the present invention.

FIG. 3 is a diagram of a digitally programmable voltage source 20, according to various embodiments of the present invention, for providing a digitally programmed voltage to a load 22. The load 22 may be, for example, any type of electronic device requiring a tightly regulated source of electrical energy for its operation, such as, for example, computer equipment, telecommunications equipment, instrumentation, etc. The digitally programmable voltage source 20 may include a power conversion subsystem 24 for converting an input voltage (Vin) to an output voltage (Vout), which is used to power the load 22. The power conversion subsystem 24 may include, for example, a switch mode or a linear power converter. In the embodiment of FIG. 3, the power conversion subsystem 24 is shown as a single phase buck converter, although according to various other embodiments, different switch mode converter topologies 24 may be used, such as a multiphase buck converter, a boost converter, a buck-boost converter, a cuk converter, their isolated derivatives, or combinations thereof. The operation of a single-phase buck converter is well known and, therefore, not further described herein.

The voltage source 20 may further include, as shown in FIG. 3, a voltage regulation subsystem 26 for regulating the output voltage of the power conversion subsystem 24. According to various embodiments, as described in more detail below, the voltage regulation subsystem 26 generates one or more control signals (PWM) that are used to control the power switches 28, 30 of the power conversion subsystem 24 based on the difference between the sensed output voltage of the power conversion subsystem 24 and a reference voltage that is determined based on a digital programming word (VID). Based on the difference (or error) between these two signals, the voltage regulation system 26 may vary the duty cycle of the control signal (PWM) used to control the power switches 28, 30 of the power conversion subsystem 24 to thereby control the ratio of the on and off times of the power switches 28, 30, to thereby regulate the output voltage of the power conversion subsystem 24 to keep the output voltage as close as possible to a desired level. The voltage regulation subsystem 26 may vary the duty cycle of the control signal based on an error signal (shown as "ERROR" in FIG. 3) indicative of the difference between the reference voltage (as determined by the digital programming word) and the sensed output voltage. The voltage regulation subsystem 26 adjusts the duty cycle of the control signal PWM to reduce or null the error signal.

The voltage regulation subsystem 26 may include a programmable error amplifier (PEA) 40, an analog-to-digital converter (A/D) 42, a digital compensator 44 and a duty ratio PWM generator 46. As described in more detail below in conjunction with FIG. 4, the PEA 40 may sense and amplify the difference between an analog signal indicative of the sensed output voltage of the power conversion subsystem 24 and a reference signal represented in a digital form that is generated based on a digital programming word (VID). The digital programming word VID may be input to the PEA 40, for example, from the load circuitry 22 or a supervisory control circuit (not shown). The A/D converter 42 may convert the analog output from the PEA 40 to a digital signal, referred to as "ERROR" in FIG. 3. The digital compensator 44 generates a signal "D" indicative of the appropriate duty ratio for the PWM control signal. The D signal is input to the duty ratio PWM generator 46, which generates the PWM signal for controlling the power switches 28, 30 of the power conversion subsystem 24 where the duty ratio of the pulses of the PWM signal are proportional to the D signal. As mentioned above, the voltage regulation subsystem 26 may adjust the duty cycle of the control signal PWM to reduce or null the error signal.

Figure 4:
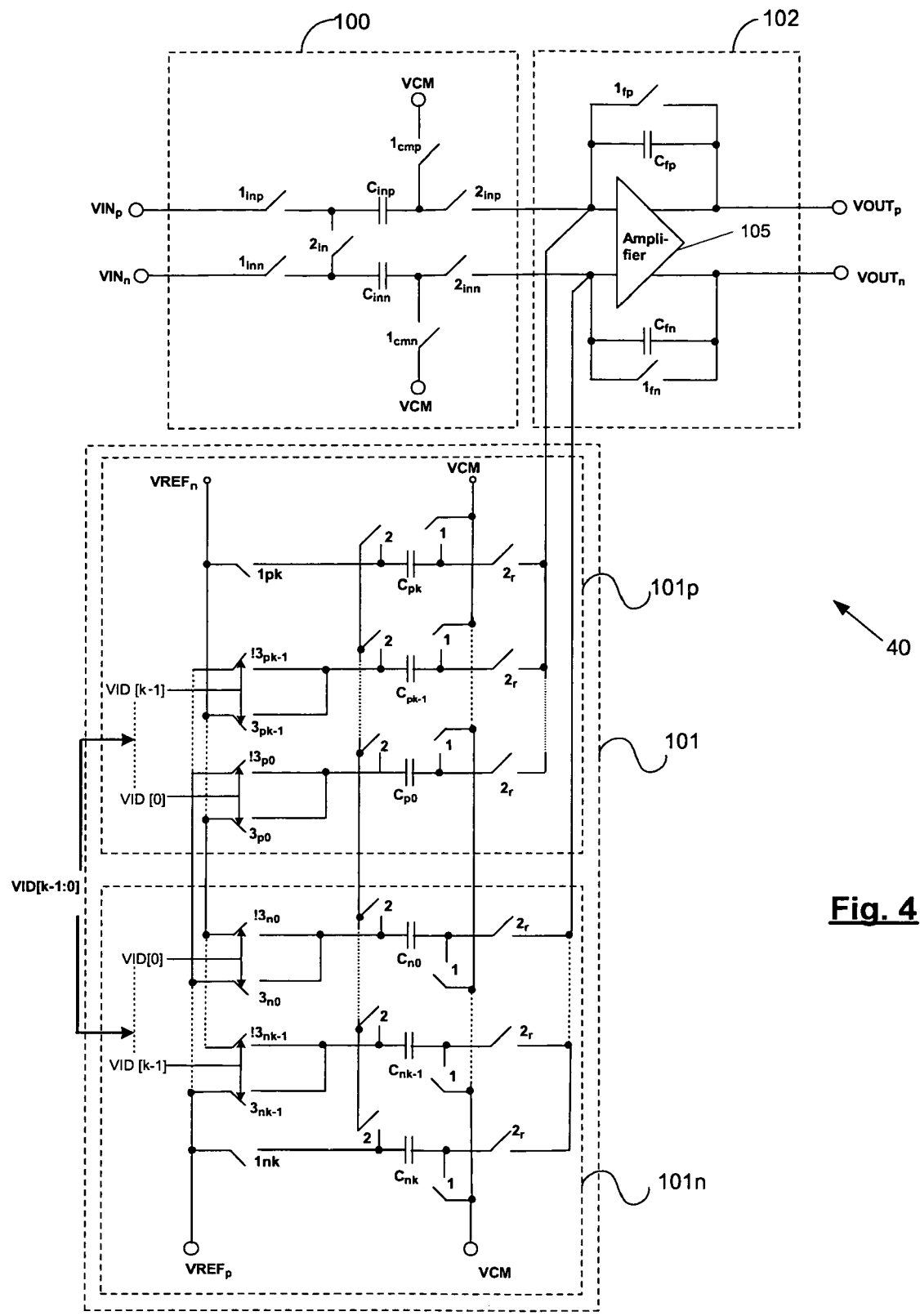
FIG. 4 is a diagram of a programmable error amplifier of the voltage source of FIG. 3 according to various embodiments of the present invention.

FIG. 4 is a diagram of the PEA 40 according to various embodiments of the present invention. The PEA 40, as shown in FIG. 4, may include a feedback voltage sampling section 100 for sampling the analog output voltage of the power conversion subsystem 24. The PEA 40 may also include a digital reference voltage sampling section 101 for generating a reference voltage that is response to the digital programming word VID, having k bits (0 to k–1). In addition, the PEA 40 may include an amplification section 102, including an amplifier 105, for amplifying the difference between the sensed output voltage and the reference voltage generated by the digital reference voltage sampling section 101 based on the control word VID.

As shown in FIG. 4, the PEA 40 (including the sections 100, 101, 102) may be implemented as a switched capacitor circuit, including a number of switches 1x, 2x, 3x, and a number of capacitors Cxx. The switches 1x, 2x, 3x may be transistors, such as, for example, MOSFETs, JFETs, or IGBTs. The operation of the switches 1xx, 2xx, of the PEA 40 may be clocked with two non-overlapping signals $\Phi 1$ and $\Phi 2$ from a clock (not shown). An active state (e.g., a logic high) of clock signal $\Phi 1$ may activate (i.e., turn on) switches denominated with the prefix "1" and an active state of clock signal $\Phi 2$ may activate the switches denominated with the prefix "2". When the clock signal $\Phi 1$ is in the active state, the PEA 40 may be in a sampling mode or phase, and when the clock signal $\Phi 2$ is in the active state, the PEA 40 may be a conversion mode or phase. Thus, the PEA 40 may periodically cycle from sampling phase to conversion phase once each clock cycle. The clock cycle of the PEA 40 may be the same as or different (either longer or shorter) from the switching cycle of the power conversion subsystem 24.

The switches denominated with the prefix 3 in the digital reference voltage sampling section 101 may be responsive to both the clock signal $\Phi 1$ and respective bits of the digital programming word VID. According to the notation used in FIG. 4, the switch 3xi (where x is either n or p, and i is one of the bits 0 to k–1 of the digital programming word VID) is closed (i.e., on) and the switch !3xi is open (i.e., off) when the ith bit of the control word VID is active (e.g., a logic high) during the sampling phase (when clock signal $\Phi 1$ is active), and the switch 3xi is open and the switch !3xi is closed when the ith bit is inactive during the sampling phase. During the conversion phase (i.e., when clock signal $\Phi 1$ is inactive and clock signal $\Phi 2$ is active), all of the prefix 3 switches are open.

The feedback voltage sampling section 100 may include, as shown in FIG. 4, a pair of input terminals VINp and VINn respectively coupled and responsive to the positive and negative terminals of the output of the power conversion subsystem 24. In the embodiment of FIG. 4, the input terminals VINp and VINn are each coupled to a respective capacitor Cinp, Cinn via a respective switch 1inp, 1inn. A switch 2in connects the capacitors Cinp, Cinn together at one terminal of the capacitors Cinp, Cinn, and the other terminal of the capacitors Cinp, Cinn is connected to a stable reference voltage (VCM) via respective switches 1cmp, 1cmn. The capacitors Cinp, Cinn are also coupled to the input terminals of the amplification section 102 via respective switches 2inp, 2inn.

In the sampling phase, the clock signal $\Phi 1$ is active and the clock signal $\Phi 2$ is inactive. Consequently, the switches of the feedback voltage sampling section 100 denominated type 1 (i.e., switches 1inp, 1inn, 1cmp, 1cmn) are closed and the switches denominated type 2 (i.e., 2in, 2inp, 2inn) are open. In this mode, therefore, the capacitors Cinp and Cinn are connected between the output voltage of the power conversion subsystem 24 (across input terminals VINp, VINn) and the reference voltage VCM. The voltage level of VCM may be essentially identical to the common mode voltage of the output of the amplifier section 102, which may be maintained with well-known common mode feedback techniques not described here and which may be chosen to be near the midpoint between the positive and negative reference voltages (not shown) of the amplifier 105. During the sampling phase, the capacitors Cinp and Cinn charge to voltages, the sum of which is equal to the differential input voltage (i.e., VINp–VINn). Depending on the relation between the common mode component of the input signal and VCM, the measured differential signal will be split between the capacitors Cinp and Cinn in varying ratios.

During the sampling phase in the digital reference voltage sampling section 101, the switches denominated with the prefix 1 and exactly half of the prefix 3 switches are on as they are controlled by the clock signal $\Phi 1$, which is active during the sampling phase, and the switches denominated with the prefix 2 are off as they are controlled by the clock signal $\Phi 2$, which is inactive during the sampling phase. The switches denominated with the prefix 3 are also responsive to respective bits of the digital programming word VID, as described above, where switches denominated 3xi (where x is either n or p, and i is one of the bits 0 to k–1 of the control word VID) are closed and the switches denominated !3xi are open when the ith bit of the control word VID is active (e.g., a logic high), and vice versa, during the sampling phase.

As can be seen in FIG. 4, the digital reference voltage sampling section 101 may include two sections, a section 101p and a section 101n. Each section 101p, 101n includes a binary weighted array of k+1 capacitors Cx0, Cx1, Cx2, . . . Cxk–1 and Cxk (where x is either p (for the section 101p) or n (for the section 101n)). That is, the capacitance of Cx1 is twice the capacitance of Cx0, the capacitance of Cx2 is twice the capacitance of Cx1, and so on, such that the capacitance of Cxk is $2^k$ times the capacitance of Cx0.

According to various embodiments as shown in FIG. 4, during the sampling phase (when clock signal $\Phi 1$ is active) each of the capacitors in the digital reference voltage sampling section 101 is connected to either of the reference voltages VREFn or VREFp depending on the state of the respective binary signal of the digital programming word for the capacitor. For example, the capacitor Cp0 is connected to VREFn if the $0^{th}$ bit of the control word (i.e., VID[0]) is a logic high through the switch 3p0 and is connected to VREFp if VID[0] is a logic low through the switch !3p0, and so on. Consequently, the smallest capacitors (Cp0, Cn0) may be responsive to the least significant digit of the digital programming word, and the capacitors Cpk–1, Cnk–1 may be responsive to the most significant digit. Also, according to various embodiments as shown in FIG. 4, the capacitor Cpk is connected to VREFn via the switch 1pk, which is on during the sampling phase since the clock signal $\Phi 1$ is active during the sampling phase. Similarly, the capacitor Cnk is connected to VREFp via the switch 1nk, which is also on during the sampling phase since the clock signal $\Phi 1$ is active during the sampling phase. Thus, the switches 1nk, 1pk, connected to the capacitors Cnk, Cpk respectively are not responsive to a bit of the digital programming word VID, but rather are responsive to the clock signal $\Phi 1$, and therefore closed during the sampling phase.

The connections of the capacitors Cxx of the digital reference voltage sampling section 101 during the sampling phase, according to various embodiments, may therefore be summarized as follows:

the capacitor Cpk: connected to VREFn;

the capacitor Cpn: connected to VREFp;

the capacitors Cp0 to Cpk–1: connected to VREFn if the respective binary signal of the digital programming word VID[k–1:0] is active and connected to VREFp is the respective binary signal of the digital programming word VID is inactive; and the capacitors Cn0 to Cnk–1: connected to VREFp if the respective binary signal of the digital programming word VID is active and connected to VREFn is the respective binary signal of the digital programming word VID is inactive.

With the switches with the prefix 1 closed in the sampling phase, the capacitors Cxx of the digital reference voltage sampling section 101 are therefore connected between one of the fixed analog reference voltages (VREFn and VREFp), as described above, and the reference voltage VCM.

Since the digital programming word VID is of length k bits, the reference voltage may be programmed in $2^k$ increments. Also, in the embodiment of FIG. 4, k+1 binary-weighted capacitors are needed in each of sections 101p and 101n. Therefore, for example, to be able to set the output reference voltage in $2^8$ (or 256) increments, nine (9) capacitors (Cx0, Cx1, . . . Cx8) may be used in each section 101p, 101n.

The amplification section 102 performs the process of amplifying the difference between the analog input voltage and the digital voltage reference that is set by the digital programming word. As shown in FIG. 4, the amplification section 102 may include an amplifier 105 and may use a negative feedback arrangement. According to various embodiments, the amplifier 105 may be an operational transconductance amplifier (OTA) whose input is the differential voltage between its input terminals and whose output is a current proportional to the differential voltage. According to one embodiment, as shown in FIG. 4, the noninverting input terminal of the amplifier 105 may be coupled to the p outputs of the feedback voltage sampling section 100 and the digital reference voltage sampling section 101p, and the inverting input terminal may be coupled to the n output of the feedback voltage sampling section 100 and the digital reference voltage sampling section 101n. The voltage across the output terminals (VOUTp, VOUTn) of the amplification section may be indicative of the error between the sensed output voltage of the power conversion subsystem 24 (which is coupled to the input terminals VINp, VINn of the section 100) and the reference voltage generated by the digital programming word VID, and may be coupled to the input terminals of the A/D converter 42 (see FIG. 3).

The capacitors Cfp, Cfn of the amplification section 102 store charge during the conversion phase and that charge is removed by the switches 1fp, 1fn respectively during the sampling phase. In particular, during the sampling phase, the switches 1fp and 1fn are closed as they are controlled by the clock signal Φ1, which is active during the sampling phase. As a result, the charge stored in the capacitors Cfp, Cfn during the previous conversion phase may be removed from the capacitors Cfp, Cfn, which, in effect, erases the memory of the previous measurement. The outputs VOUTp and VOUTn may at or near the VCM voltage level due to, as described above, a common feedback circuit (not shown).

During the conversion phase, the switches with the prefix 1 in the sections 100, 101, 102, and the switches with prefix 3 in section 101, are open and the switches with the prefix 2 are closed (regardless of the accompanying index in FIG. 4). As described above, the clock signals Φ1 and Φ2 may be non-overlapping such that the exact instance of the opening of the switches of prefix 1 may precede the exact instance of the closing of the switches of prefix 2 to avoid cross-conduction, as is practiced in many switched capacitor circuits. During the conversion phase, with the switches of prefix 1 and 3 open and the switches of prefix 2 closed, the capacitors of sections 100 and 101 transfer their charges to the input of the amplifier 105 via their associated switch. That is, for example, the charge on the capacitor Cinp in section 100 is transferred to the noninverting terminal of the amplifier 105 via the switch 2inp and the charge on the capacitor Cinn is transferred to the inverting terminal of the amplifier 105 via the switch Cinn. Similarly, the charge on the capacitors Cp0, Cp1, ... Cpk-1, Cpk of the digital reference voltage sampling section 101 is transferred via the associated switches 2r to the noninverting terminal of the amplifier 105, and the charge on the capacitors Cn0, Cn1, ... Cnk-1, Cnk is transferred via the associated switches 2r to the inverting terminal of the amplifier 105.

The polarity of the charge from sections 100 and 101 is preferably opposite such that the process of equalizing the differential input voltage of the amplifier 105 during the conversion phase has the effect of subtracting the charges at the input terminals of the amplifier. That is, for example, when the charge on the capacitors in sections 100 and 101 is transferred to the amplification section at the start of the conversion phase, the combined charge on the capacitors Cp0, Cp1, ... Cpk-1, Cpk of the digital reference voltage sampling section 101p is subtracted from the charge on the capacitor Cinp of the feedback voltage sampling section 100 at the noninverting terminal of the amplifier 105, and the combined charge on the capacitors Cn0, Cn1, ... Cnk-1, Cnk of the digital reference voltage sampling section 101n is subtracted from the charge on the capacitor Cinn of the feedback voltage sampling section 100 at the inverting terminal of the amplifier 105. Because the charge is a linear representation of the voltages, subtracting the charge may be considered an accurate replication of the process of subtracting the digital reference voltage from the analog input voltage (i.e., the sensed output voltage from the power conversion subsystem 24), assuming no material dependence of the capacitance on the operating condition, mainly voltage, which is typically a valid assumption in this case.

As the process of transferring the charge from sections 100, 101 to the input of the amplifier 105 takes place (at a rate determined by the time constants resulting from the capacitors and the channel resistance of the respective switches), a differential voltage appears across the inputs of the amplifier 105. This differential input voltage is amplified by the amplifier 105 and causes a change in the output voltage of the amplifier 105, appearing across output terminals VOUTp and VOUTn. This in turn, due to the negative feedback arrangement involving the capacitors Cfp and Cfn, counters the rise of the differential input voltage according to the principles of operation of operational amplifiers well known in the art. At the end of the conversion phase, therefore, the amplifier 105 restores the balance by having supplied enough charge to its input nodes via the feedback capacitors Cfp, Cfn such that the differential input voltage is brought back to equilibrium (which is a small quantity of charge if the gain of the amplifier 105 is sufficiently high). This situation, in turn, means that the capacitors Cinp, Cinn and Cxx are fully depleted of their charge (the switches 2inp and 2inn being closed during the conversion phase). It follows, therefore, that the amount of charge delivered by the feedback capacitors Cfp, Cfn equals the charge that was present in the capacitors Cinp, Cinn and Cxx just prior to commencement of the conversion phase. Because the current carrying this charge, in various embodiments, flows through the feedback capacitors Cfp, Cfn, these capacitors receive the net charge equal to the charge that was stored in the input capacitor Cinp, Cinn during the sampling phase.

The resulting voltage developed across the feedback capacitors Cfp, Cfn corresponds to the charge stored in the feedback capacitors Cfp, Cfn divided by their capacitance. The ratio between the feedback capacitors (Cfp, Cfn) and the combined capacitance of sections 100 and 101 determines the gain of the amplifier 105. As a result, the reference level for the error amplification process may be proportional to the product of the binary value of the digital programming word and the elemental voltage increment. The elemental voltage increment may be determined by the amplitude of the fixed analog reference (i.e., VREFp. VREFn) and the ratio between the smallest capacitors (Cp0, Cn0) and the feedback capacitors Cfp, Cfn of the amplification section 102.

In the embodiment of the PEA 40 described above, the PEA 40 is fully differential. That is, the voltage of the analog feedback voltage input (across VINp and VINn of section 100) is carried between negative and positive signal lines as opposed to between the signal and a ground line, and further processing is carried out maintaining this differential structure. According to other embodiments, however, the PEA 40 may be implemented using, for example, a single ended configuration.

Among the benefits that may be realized with embodiments of the present invention is that only one amplifier (amplifier 105) is needed, which reduces offset and drift errors. Also, highly accurate capacitor ratios may be used for scaling voltages. In addition, a low-resolution flash A/D converter 42 (see FIG. 3) may be used to converter the output signal of the PEA to a digital error signal while still maintaining sufficient regulation of the programmable voltage source. Also, the use of a differential structure (i.e., carrying signals between negative and positive signal lines) makes the PEA less susceptible to noise, as does disconnecting the amplifier from the analog input during the second operational (conversion) phase.

Figure 1:
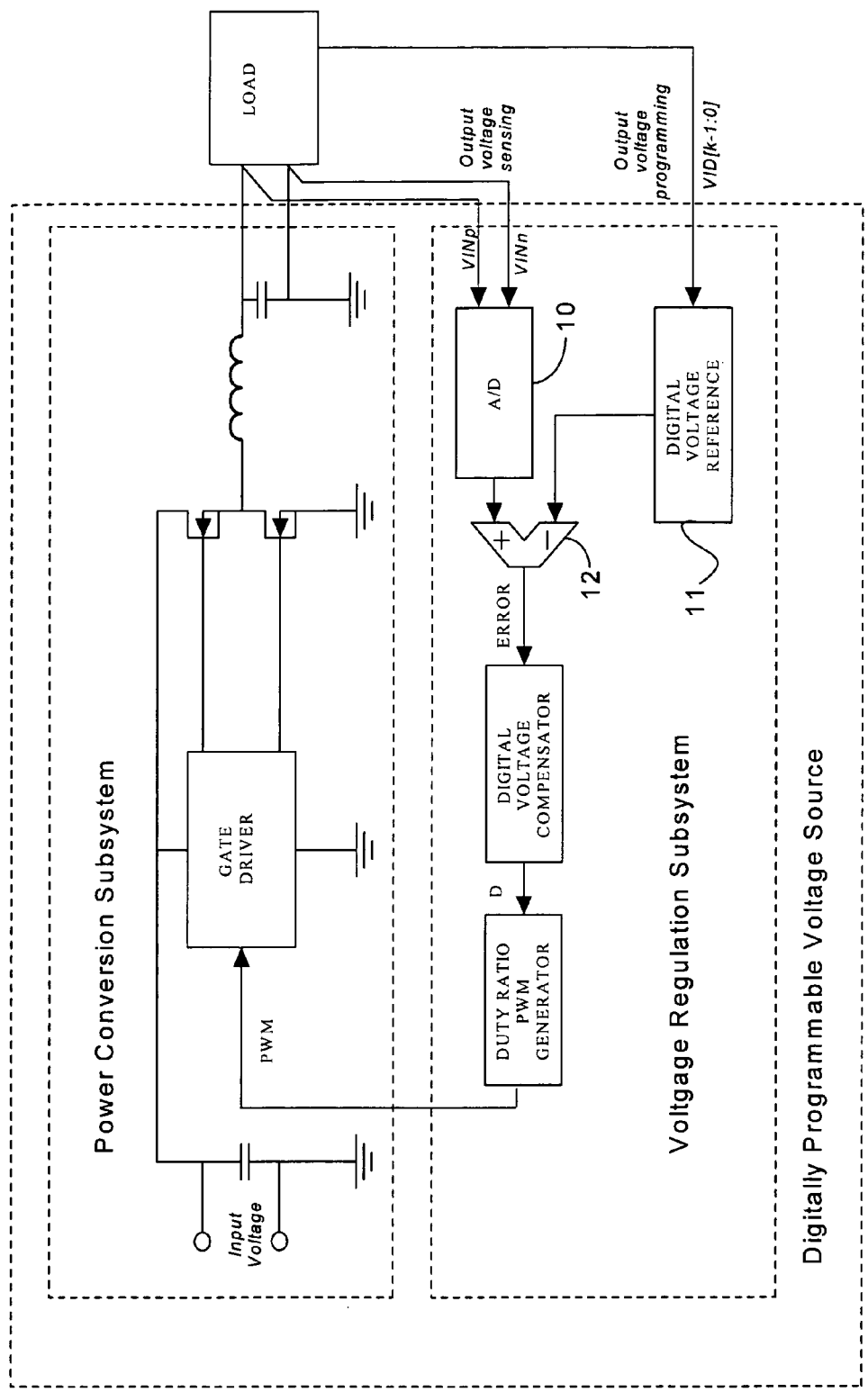
FIGS. 1 and 2 are diagrams of prior art digitally programmable voltage sources.
Figure 2:
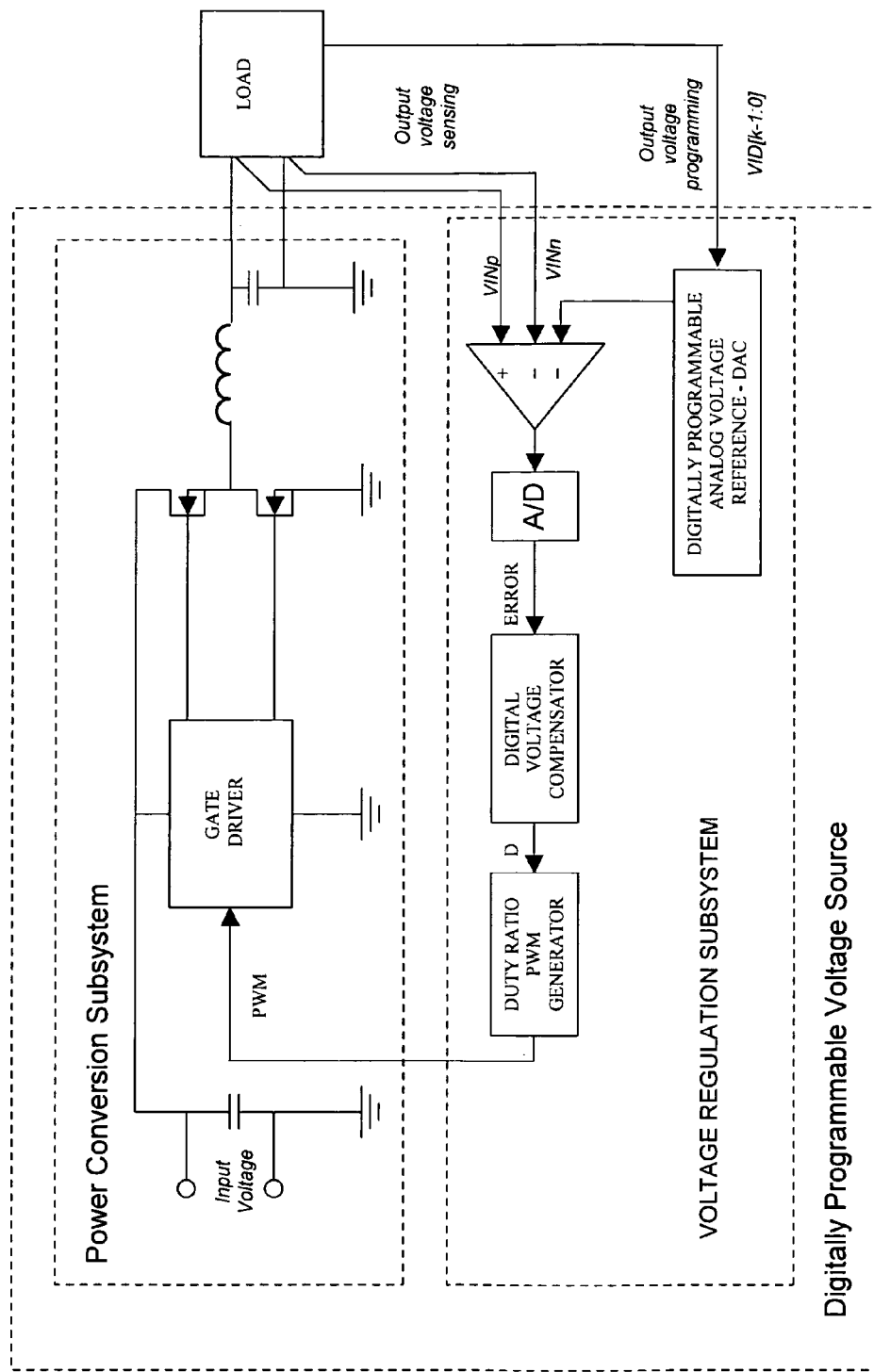

According to various embodiments, the components of the PEA 40 (including the components of sections 100, 101, 102) may be integrated on a semiconductor die in an integrated circuit. Further, one or more of the components of the voltage regulation system (see FIG. 2), including the PEA 40, the A/D converter 42, the digital compensator 44, and the duty ratio PWM generator 46 may be integrated on a semiconductor die in an integrated circuit.

Although the present invention has been described herein with respect to certain embodiments, including the preferred embodiment, those of ordinary skill in the art will recognize that many modifications and variations of the present invention may be implemented, including the use of a single ended configuration, various implementations of the amplifier 105, the use of a modified scaling network, replacing the capacitors Cp0, Cp1, . . . Cpk−1, Cpk and/or Cn0, Cn1, . . . Cnk−1, Cnk with a binary weighted resistor ladder, the use of modified clocking patterns, etc. Also, any of the semiconductor switches described herein may be implemented as a single semiconductor switch or a number of semiconductor switches connected in parallel. The foregoing description and the following claims are intended to cover all such modifications and variations.

What is claimed is:

1. A programmable error amplifier comprising:
an amplification circuit including an amplifier and a plurality of feedback capacitors;
an analog voltage sampling circuit responsive to an analog input voltage and coupled to the amplification circuit, wherein the analog voltage sampling circuit stores a charge dependent upon the analog input voltage during a first operational phase and transfers the charge to the feedback capacitors of the amplification circuit during a second operational phase; and
a digital reference voltage sampling circuit coupled to the amplification circuit for generating a reference voltage, wherein the digital reference voltage sampling circuit includes at least one binary weighted array of capacitors, wherein the reference voltage is varied responsive to a digital programming word, and wherein the digital reference voltage sampling circuit stores a charge dependent upon the digital programming word during the first operational phase and transfers the charge to the feedback capacitors of the amplification circuit during the second operational phase.

2. The programmable error amplifier of claim 1, wherein output terminals of the analog voltage sampling circuit and output terminals of the digital reference voltage sampling circuit are connected to input terminals of the amplifier of the amplification circuit such that a differential voltage based on the difference between the analog voltage and the generated reference voltage appears across input terminals of the amplifier.

3. The programmable error amplifier of claim 2, wherein the amplifier of the amplification circuit includes an operational transconductance amplifier.

4. The programmable error amplifier of claim 1, wherein the digital programming word has a length of k bits and the at least one binary weighted array of capacitors includes k+1 binary weighted capacitors.

5. The programmable error amplifier of claim 4, wherein the capacitors of the at least one array of binary weighted capacitors are connected to a first reference voltage during the first operational phase when the respective binary signals of the digital programming word for the capacitors are a first logic value and are connected to a second reference voltage during the first operational phase when the respective binary signals of the digital programming word for the capacitors are a second logic value.

6. The programmable error amplifier of claim 4, wherein the amplifier of the amplification circuit includes an operational transconductance amplifier.

7. A voltage regulation circuit for a programmable voltage source that produces an analog output voltage, the voltage regulation circuit comprising:
a programmable error amplifier including:
an amplification circuit including an amplifier and a plurality of feedback capacitors;
a feedback voltage sampling circuit responsive to the analog output voltage of the programmable voltage source and coupled to the amplification circuit, wherein the feedback voltage sampling circuit stores a charge dependent upon the analog output voltage during a first operational phase and transfers the charge to the feedback capacitors of the amplification circuit during a second operational phase; and
a digital reference voltage sampling circuit coupled to the amplification circuit for generating a reference voltage, wherein the digital reference voltage sampling circuit includes at least one binary weighted array of capacitors, wherein the reference voltage is varied responsive to a digital programming word, and wherein the digital reference voltage sampling circuit stores a charge dependent upon the digital programming word during the first operational phase and transfers the charge to the feedback capacitors of the amplification circuit during the second operational phase; and
an analog-to-digital converter coupled to the output of the amplification circuit of the programmable error amplifier.

8. The voltage regulation circuit of claim 7, further comprising a duty ratio PWM generator coupled to the analog-to-digital converter for producing a signal for controlling a switch of the programmable voltage source.

9. The voltage regulation circuit of claim 7, wherein output terminals of the feedback voltage sampling circuit and output terminals of the digital reference voltage sampling circuit are connected to input terminals of the amplifier such that a differential voltage based on the difference between the analog voltage and the generated reference voltage appears across input terminals of the amplifier.

10. The voltage regulation circuit of claim 9, wherein the amplifier of the amplification circuit includes an operational transconductance amplifier.

11. The voltage regulation circuit of claim 7, wherein the digital programming word has a length of k bits and the at least one binary weighted array of capacitors include k+1 binary weighted capacitors.

12. The voltage regulation circuit of claim 11, wherein the amplifier of the amplification circuit includes an operational transconductance amplifier.

13. The voltage regulation circuit of claim 7, wherein the analog-to-digital converter includes a flash analog-to-digital converter.

14. A programmable voltage source, comprising:
a power conversion subsystem for converting an analog input voltage to an analog output voltage; and
a voltage regulation subsystem for regulating the analog output voltage of the power conversion subsystem based on a digital programming word, the voltage regulation system comprising a programmable error amplifier, wherein the programmable error amplifier comprises:
an amplification circuit including an amplifier and a plurality of feed back capacitors;
a feedback voltage sampling circuit responsive to the analog output voltage of the power conversion subsystem and coupled to the amplification circuit, wherein the feedback voltage sampling circuit stores a charge dependent upon the analog output voltage during a first operational phase and transfers the charge to the feedback capacitors of the amplification circuit during a second operational phase; and a digital reference voltage sampling circuit coupled to the amplification circuit for generating a reference voltage, wherein the digital reference voltage sampling circuit includes at least one binary weighted array of capacitors, wherein the reference voltage is varied responsive to the digital programming word, and wherein the digital reference voltage sampling circuit stores a charge dependent upon the digital programming word during the first operational phase and transfers the charge to the feedback capacitors of the amplification circuit during the second operational phase.

15. The programmable voltage source of claim 14, wherein output terminals of the feedback voltage sampling circuit and output terminals of the digital reference voltage sampling circuit are connected to input terminals of the amplifier such that a differential voltage based on the difference between the analog voltage and the generated reference voltage appears across input terminals of the amplifier.

16. The programmable voltage source of claim 15, wherein the amplifier of the amplification circuit includes an operational transconductance amplifier.

17. The programmable voltage source of claim 14, wherein the digital programming word has a length of k bits and the at least one binary weighted array of capacitors include k+1 binary weighted capacitors.

18. The programmable voltage source of claim 17, wherein the amplifier of the amplification circuit includes an operational transconductance amplifier.

19. The programmable voltage source of claim 14, wherein the voltage regulation subsystem further comprises a flash analog-to-digital converter coupled to the output of the amplification circuit of the programmable error amplifier.

20. A programmable error amplifier comprising:

a first and second binary weighted array of capacitors;

an amplification circuit including an amplifier and a plurality of feedback capacitors; and a network of switches, connected to the first and second array of capacitors and to the amplifier, wherein the switches are operated such that:

during a first operational phase, the first array of capacitors stores a charge dependent upon an analog input voltage and the second array of capacitors stores a charge dependent upon a digital programming word, wherein the digital programming word is indicative of a reference voltage to be output by the second array of capacitors, and during a second operation phase, the stored charge on the first and second arrays of capacitors is transferred to the feedback capacitors of the amplification circuit such that a differential voltage based on a difference between the analog voltage and the reference voltage indicated by the digital programming word appears across input terminals of the amplifier.

21. The programmable error amplifier of claim 20, wherein the amplifier of the amplification circuit includes an operational transconductance amplifier.

* * * * *

UNITED STATES PATENT AND TRADEMARK OFFICE
CERTIFICATE OF CORRECTION

| | |
|---|---|
| PATENT NO. | : 7,190,291 B2 |
| APPLICATION NO. | : 11/029307 |
| DATED | : March 13, 2007 |
| INVENTOR(S) | : Piotr Markowski et al. |

It is certified that error appears in the above-identified patent and that said Letters Patent is hereby corrected as shown below:

Column 6, line 56, delete "0to k-1" and replace therewith --0 to k-1--.

Column 12, line 64, delete "feed back" and replace therewith --feedback--.

Signed and Sealed this

Fourth Day of May, 2010

David J. Kappos
*Director of the United States Patent and Trademark Office*